US011992099B2

(12) United States Patent
Gleaton

(10) Patent No.: US 11,992,099 B2
(45) Date of Patent: May 28, 2024

(54) ELECTRONIC EAR BACK SCREWDRIVER

(71) Applicant: Asia D. Gleaton, Hamilton, NJ (US)

(72) Inventor: Asia D. Gleaton, Hamilton, NJ (US)

(73) Assignee: Asia D. Gleaton, Hamilton, NJ (US)

( * ) Notice: Subject to any disclaimer, the term of this patent is extended or adjusted under 35 U.S.C. 154(b) by 205 days.

(21) Appl. No.: 17/359,525

(22) Filed: Jun. 26, 2021

(65) Prior Publication Data

US 2022/0408887 A1 Dec. 29, 2022

(51) Int. Cl.
*A44C 7/00* (2006.01)
*B25B 21/00* (2006.01)

(52) U.S. Cl.
CPC ............ *A44C 7/003* (2013.01); *B25B 21/002* (2013.01)

(58) Field of Classification Search
CPC ........ A44C 7/003; A44C 7/004; B25B 21/002
USPC .......................................................... 81/473
See application file for complete search history.

(56) References Cited

U.S. PATENT DOCUMENTS 2,572,601 A * 10/1951 De Wilde ............. A44C 7/004 464/30

* cited by examiner

*Primary Examiner* — Tom Rodgers
(74) *Attorney, Agent, or Firm* — Steven War; War IP Law PLLC

(57) ABSTRACT

A system for aiding the process of installing screw post earrings. The device is comprised of a portable, handheld, battery-operated, earring screw tool having the following parts: an interchangeable head that turns the decorative portion of an earring magnetically and a slotted head that turns an earring backing to secure an earring to the ear. The tool also has a sliding switch that allows the user to screw an earring on and off by turning the head forward or backward using only the finger tips. An object of the invention is to make the process of donning and doffing screw post earrings more manageable.

9 Claims, 5 Drawing Sheets

ELECTRONIC EAR BACK SCREWDRIVER

CROSS-REFERENCE TO RELATED APPLICATIONS

This application claims the benefit of U.S. Provisional Patent Application No. 63/136,015, filed on Jan. 11, 2021.

FIELD OF THE INVENTION

The present invention generally relates to earrings. More specifically, it relates to a system for assisting those installing screw post earrings in their ears.

BACKGROUND

The use of a post and clamp is a common manner to retain ornaments that are worn on the ears such as earrings. In general, any ornament that is worn on the ear is referred to as an "earring" or "ear ring," notwithstanding the actual geometric shape of the device. Posts used with earrings are often straight rods which extend from the ornamental element of the jewelry piece and through a hole that has been pierced through the ear. The opposite side of the ear the post is often engaged to retain the earring in place. There have been a number of devices developed over the years that hold or engage a post including clasps, clutches or clamps. Another earring retaining arrangement (referred to as a screw back or screw post) includes a threaded post—like a bolt. These threads may engage opposite threads that are provided on an inner diameter surface of a central aperture through a disk and, a second aperture that is provided through the apex of an arch that extends from one side of the disk to the opposite side. This arrangement is often employed when the user is wearing valuable jewelry such as diamonds and is conventionally thought to be a more secure manner in which to retain the earrings. While this technique has some advantages, installing screw post earrings can be challenging to the user. The backing has to be held perpendicular to the screw post behind the ear while the user screws the ornamental portion of the earring into the backing. Spinning the earring can be time consuming and frustrating. The earring industry has developed tools to assist with earring issues. U.S. Pat. No. 5,297,997A granted to Timothy J. Covi disclosed a manual, hand held tool that creates threads on earring posts. U.S. Pat. No. 8,196,984B2 granted to Alexa Lea Haushalter disclosed a manual tool that removes earrings from purchase cards. U.S. Pat. No. 5,096,169A granted to Richard R. Behnke disclosed a manual earring tool to be used when crafting earrings. What is needed is a tool that performs the spinning motion quickly and can make the earring installation process simple.

SUMMARY OF THE INVENTION

The device herein disclosed and described provides a solution to the shortcomings in the prior art through the disclosure of a system for aiding the process of installing screw post earrings.

Another object of the invention is to allow a user to screw ornamental portions of earrings into backings easily. The device grips the ornamental portion of the earring and automatically turns it to engage the backing without the user having to manually twist their fingers—which can be difficult.

Another object of the invention is to allow ferrous earrings to be mounted to the head of the device easily. One head contains a magnet that will hold the ornamental portion while installing into a backing.

Another object of the invention is to allow a looped-shaped backing to be mounted to the head of the device easily. Another head is made of a rubber material with a slot that holds the backing allowing the user to spin the backing onto the ornamental earring's screw post.

Another object of the invention is to allow an easy means to screw an earring on or off. The screwing direction is controlled by a slider switch that when pushed forward turns the head in a clockwise direction (screwing on) and when pushed downward turns the head in a counter clockwise direction (screwing off).

It is briefly noted that upon a reading this disclosure, those skilled in the art will recognize various means for carrying out these intended features of the invention. As such it is to be understood that other methods, applications and systems adapted to the task may be configured to carry out these features and are therefore considered to be within the scope and intent of the present invention, and are anticipated. With respect to the above description, before explaining at least one preferred embodiment of the herein disclosed invention in detail, it is to be understood that the invention is not limited in its application to the details of construction and to the arrangement of the components in the following description or illustrated in the drawings. The invention herein described is capable of other embodiments and of being practiced and carried out in various ways which will be obvious to those skilled in the art. Also, it is to be understood that the phraseology and terminology employed herein are for the purpose of description and should not be regarded as limiting.

As such, those skilled in the art will appreciate that the conception upon which this disclosure is based may readily be utilized as a basis for designing of other structures, methods and systems for carrying out the several purposes of the present disclosed device. It is important, therefore, that the claims be regarded as including such equivalent construction and methodology insofar as they do not depart from the spirit and scope of the present invention. As used in the claims to describe the various inventive aspects and embodiments, "comprising" means including, but not limited to, whatever follows the word "comprising". Thus, use of the term "comprising" indicates that the listed elements are required or mandatory, but that other elements are optional and may or may not be present. By "consisting of" is meant including, and limited to, whatever follows the phrase "consisting of". Thus, the phrase "consisting of" indicates that the listed elements are required or mandatory, and that no other elements may be present.

By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they affect the activity or action of the listed elements. The objects features, and advantages of the present invention, as well as the advantages thereof over existing prior art, which will become apparent from the description to follow, are accomplished by the improvements described in this specification and hereinafter described in the following detailed description which fully discloses the invention, but should not be considered as placing limitations thereon.

BRIEF DESCRIPTION OF THE FIGURES

The accompanying drawings, which are incorporated herein and form a part of the specification, illustrate some, but not the only or exclusive, examples of embodiments and/or features.

Figure 1:
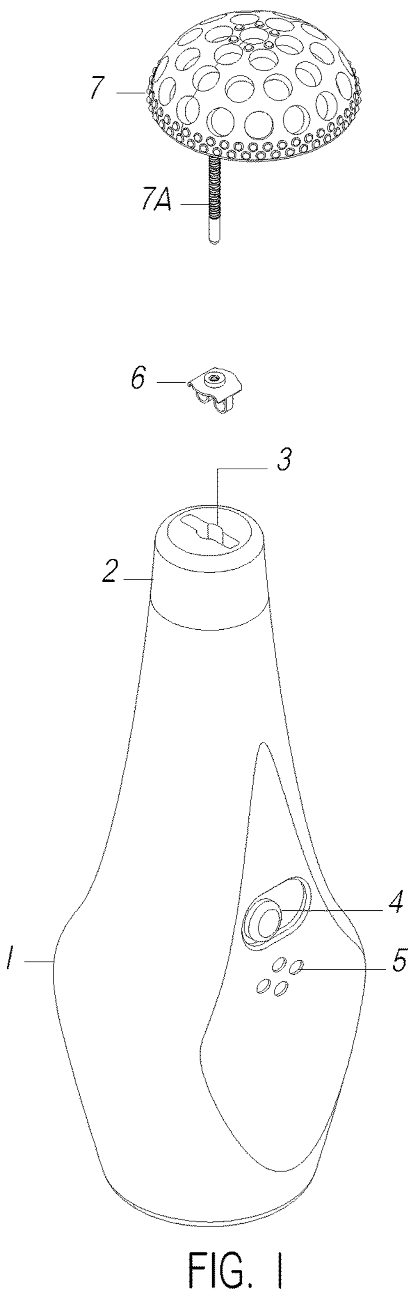
FIG. 1 shows a perspective view of the device in use.

Other aspects of the present invention shall be more readily understood when considered in conjunction with the accompanying drawings, and the following detailed description, neither of which should be considered limiting.

DETAILED DESCRIPTION OF FIGURES

In this description, the directional prepositions of up, upwardly, down, downwardly, front, back, top, upper, bottom, lower, left, right and other such terms refer to the device as it is oriented and appears in the drawings and are used for convenience only; they are not intended to be limiting or to imply that the device has to be used or positioned in any particular orientation. Conventional components of the invention are elements that are well-known in the prior art and will not be discussed in detail for this disclosure.

Figure 2:
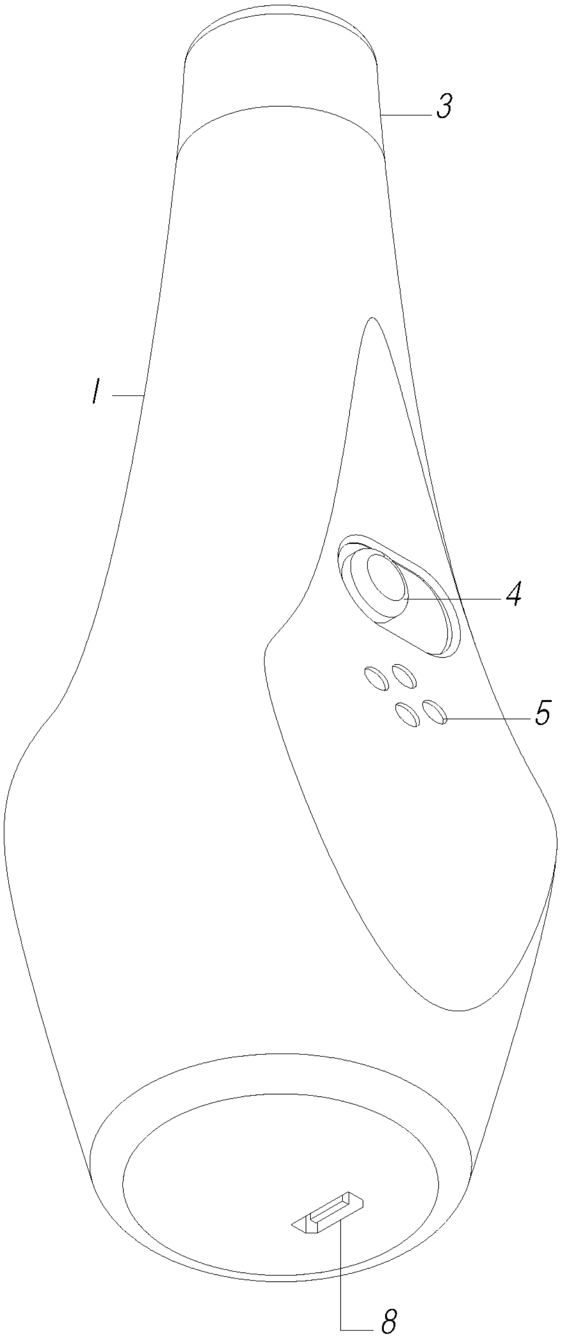
FIG. 2 shows a bottom perspective view of the device.
Figure 3:
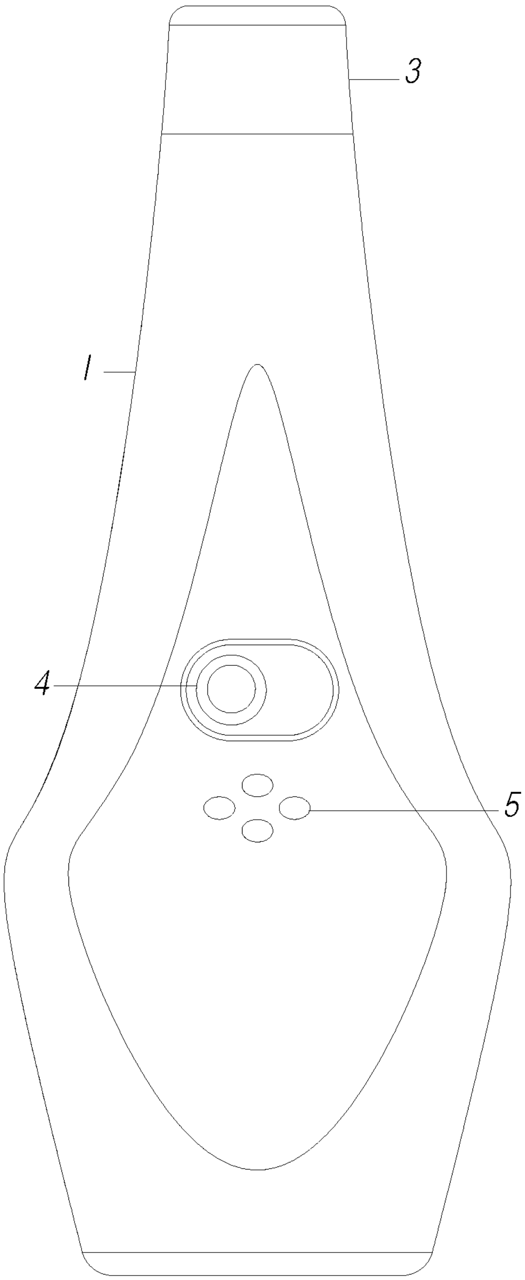
FIG. 3 shows a front view of the device.
Figure 4:
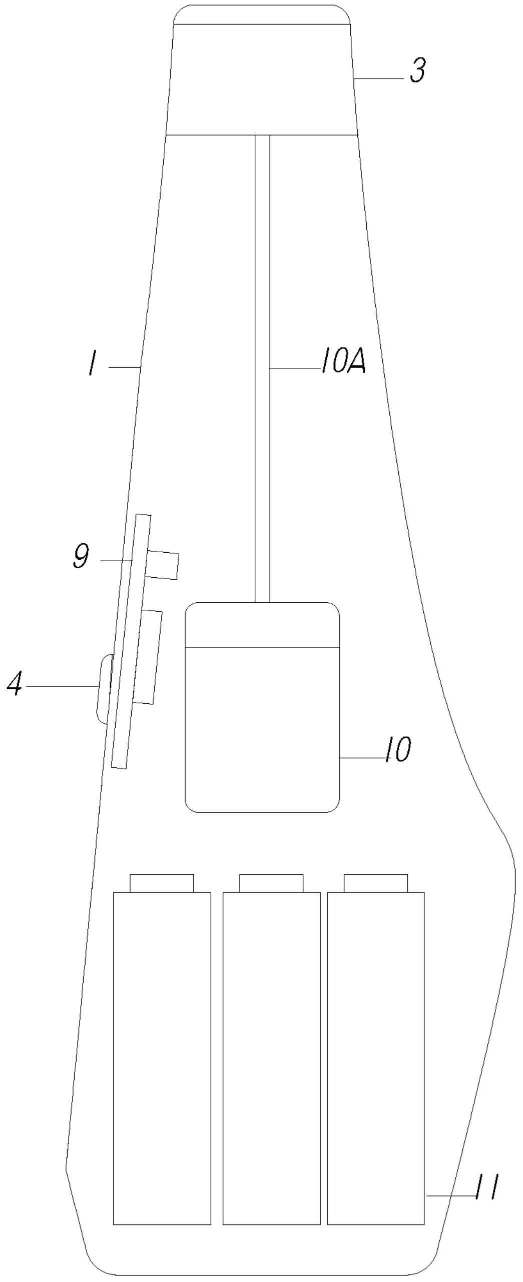
FIG. 4 shows a sectional view of the device.
Figure 5:
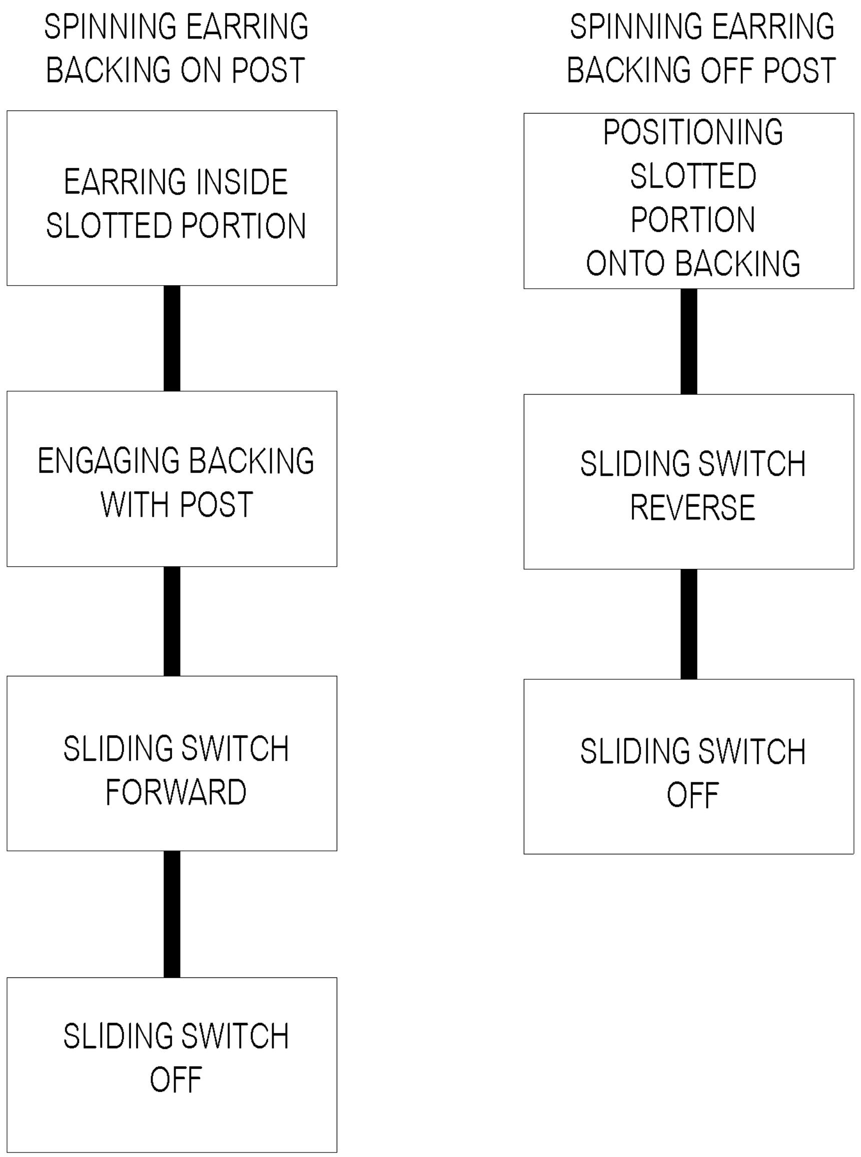
FIG. 5 shows the method of the device.

FIGS. 1-3 show a preferred embodiment of the device being comprised of a cylindrical-shaped body 1 with circular sliding switch 4 (having at least three positions: two distal and one proximal-controlling the functions forward, reverse and power of electric motor 10) and cylindrical-shaped, interchangeable head 2. Said interchangeable head 2 comprised of a rigid material such as plastic and having a slotted portion that engages earring 7's backing 6 and rotatably-attaches and detaches said backing 6 on earring post 7A when circular slider switch 4 is operated by a user to either connect or disconnect backing 6 from earring post 7A. Said cylindrical-shaped body 1 and cylindrical-shaped interchangeable head 2 being made of a rigid material such as but not limited to plastic and the like. FIG. 4 showing the cylindrical-shaped interchangeable head 2 being connected to an electric motor 10 by means of axle 10A and disposed inside the cylindrical-shaped body 1 that is powered by rechargeable batteries 11 (including but not limited to nickel hydride, lithium ion etc.) also there inside. When said circular sliding switch 4 is selected, it sends signals to micro controller 9 which then commands the electric motor 10 to spin either clockwise or counter clockwise thereby spinning earring backing 6 on or off earring post 7A. The device also having a charging port 8 on a distal end (that includes but is not limited to a universal serial bus (USB) port, micro USB port etc.) and a plurality of light emitting diode (LED) status lights 5 of varying colors. The rechargeable batteries 11, circular sliding switch 4, electric motor 10, charging port 8, and LED status lights 5 all being connected and governed by micro controller 9 also inside said cylindrical-shaped body 1. Other embodiments of the device can include a magnet on a distal end to selectively anchor a ferrous ornamental portion of an earring 7 (encased in a protective rubber material such as silicone etc.) for turning instead of the aforementioned backing 6. Other embodiments of the invention can also incorporate different shapes for the cylindrical-shaped body 1—such as tear-drop shapes, square shapes etc. and be operated by other switching devices such as but not limited to press buttons, toggle switches and the like. FIG. 5 illustrates the method of spinning earring backings onto earring posts comprising the following steps: placing an earring backing inside the slotted portion of the cylindrical-shaped interchangeable head; engaging the earring backing with the earring post; sliding the circular sliding switch to the forward position; and sliding the circular sliding switch to the off position when the earring is installed on the earring post. The figure also illustrates the method of spinning earring backings off of earring posts comprising the following steps: positioning the slotted portion of the cylindrical-shaped interchangeable head onto the earring backing; sliding the circular sliding switch to the reverse position; sliding the circular sliding switch to the off position when the earring is removed from the earring post; and removing the earring backing from the slotted portion of the cylindrical-shaped interchangeable head.

It is additionally noted and anticipated that although the device is shown in its most simple form, various components and aspects of the device may be differently shaped or slightly modified when forming the invention herein. As such those skilled in the art will appreciate the descriptions and depictions set forth in this disclosure or merely meant to portray examples of preferred modes within the overall scope and intent of the invention, and are not to be considered limiting in any manner. While all of the fundamental characteristics and features of the invention have been shown and described herein, with reference to particular embodiments thereof, a latitude of modification, various changes and substitutions are intended in the foregoing disclosure and it will be apparent that in some instances, some features of the invention may be employed without a corresponding use of other features without departing from the scope of the invention as set forth. It should also be understood that various substitutions, modifications, and variations may be made by those skilled in the art without departing from the scope of the invention.

What is claimed is:

1. A system, that spins earring backings on and off earring posts comprising:

1. a screwdriver comprising:
   a) a cylindrical-shaped body;
   b) a cylindrical-shaped head with a slotted portion;
   c) a sliding switch;
   d) a micro controller;
   e) a charging port;
   f) an electrical motor;
   g) an axle; and
   h) batteries
2. an earring with a threaded post
3. an earring backing with an internal thread; wherein the earing backing mates with the indie of the slotted portion to be rotated.

2. The system of claim 1, wherein the cylindrical-shaped body and the cylindrical-shaped head are made of a rigid material.

3. The system of claim 1, wherein said sliding switch controls the electric motor's forward motion, reverse motion and its power.

4. The system of claim 1, wherein the charging port is comprised of a USB port.

5. The system of claim 1, further including at least one LED status light and the LED status light includes varying colors.

6. The system of claim 1, wherein the batteries are rechargeable and comprised of lithium ion batteries.

7. The system of claim 1, wherein the cylindrical-shaped head is connected to the electric motor by means of the axle.

8. A method of spinning earring backings onto earring posts comprising the following steps:

a) providing a device comprising a cylindrical-shaped body, a cylindrical-shaped head with a slotted portion, a sliding switch, and an electric motor;

b) placing an earring backing inside the slotted portion of the cylindrical-shaped head;

c) engaging the earring backing with a threaded earring post;

d) sliding the sliding switch to a forward position; and e) sliding the sliding switch to the off position when the earring is installed on the earring post.

9. A method of spinning earring backings off of earring posts comprising the following steps:

a) providing a device comprising a cylindrical-shaped body, a cylindrical-shaped head with a slotted portion, a sliding switch, and an electric motor;

b) positioning the slotted portion of the cylindrical-shaped head onto an earring backing;

c) sliding the sliding switch to the reverse position;

d) sliding the sliding switch to the off position when the earring is removed from the earring post; and e) removing the earring backing from the slotted portion of the cylindrical-shaped head.

* * * * *